United States Patent
Zhu et al.

(10) Patent No.: US 10,884,623 B2
(45) Date of Patent: Jan. 5, 2021

(54) METHOD AND APPARATUS FOR UPGRADING A DISTRIBUTED STORAGE SYSTEM

(71) Applicant: Alibaba Group Holding Limited, Grand Cayman (KY)

(72) Inventors: Jiaji Zhu, Hangzhou (CN); Shuqi Zhao, Hangzhou (CN); Jiangbin Lin, Hangzhou (CN); Yuesheng Gu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 366 days.

(21) Appl. No.: 15/781,617

(22) PCT Filed: Dec. 19, 2016

(86) PCT No.: PCT/CN2016/110722
§ 371 (c)(1),
(2) Date: Jun. 5, 2018

(87) PCT Pub. No.: WO2017/114213
PCT Pub. Date: Jul. 6, 2017

(65) Prior Publication Data
US 2020/0264777 A1    Aug. 20, 2020

(30) Foreign Application Priority Data
Dec. 31, 2015 (CN) .......................... 2015 1 1034171

(51) Int. Cl.
*G06F 3/06* (2006.01)
*H04L 29/08* (2006.01)

(52) U.S. Cl.
CPC .......... *G06F 3/0607* (2013.01); *G06F 3/067* (2013.01); *G06F 3/0659* (2013.01); *H04L 67/1097* (2013.01)

(58) Field of Classification Search
None
See application file for complete search history.

(56) References Cited

U.S. PATENT DOCUMENTS 7,103,650 B1  9/2006  Vetrivelkumaran et al.
7,149,508 B2  12/2006  Herle
(Continued)

FOREIGN PATENT DOCUMENTS

CN    101901275 A   12/2010
CN    102694860 A   9/2012
(Continued)

OTHER PUBLICATIONS

Extended European Search Report to corresponding EP Application No. 16881002.6 dated May 7, 2019 (9 pages).
(Continued)

*Primary Examiner* — Cai Y Chen
(74) *Attorney, Agent, or Firm* — James J. DeCarlo; Greenberg Traurig, LLP

(57) ABSTRACT

Embodiments of the disclosure provide a method and apparatus for upgrading a distributed storage system, and the disclosure relates to the field of distributed computer technology. In the disclosure, a client sends write requests regarding the same to-be-written data to a plurality of data servers at the same time; then how many data servers the to-be-written data is successfully written into is analyzed; it is determined whether the number of the successful writes is greater than a pre-defined number; and first feedback information or second feedback information is sent to each data server having a successful write according to the determining result. The data server then determines whether it is in an upgradeable state or a non-upgradeable state according to the received first feedback information or second feedback information. Based on the state of the data server, an upgrade control server may select to notify, in a rolling manner, the
(Continued)

data server to perform an upgrade operation. Therefore, a shorter response time of the system to the client is ensured without having to stop the high-level services, and data reliability is improved, significantly reducing the risk of user data loss.

20 Claims, 9 Drawing Sheets

(56) References Cited

U.S. PATENT DOCUMENTS

| | | |
|---|---|---|
| 7,165,250 B2 | 1/2007 | Lyons |
| 7,386,114 B1 | 6/2008 | Robesky |
| 8,103,903 B2 | 1/2012 | Hafner et al. |
| 8,171,466 B2 | 5/2012 | Langen et al. |
| 8,195,824 B2 | 6/2012 | Park et al. |
| 9,043,778 B2 | 5/2015 | Lin et al. |
| 9,379,954 B2 | 6/2016 | DeLeo et al. |
| 9,584,361 B2 | 2/2017 | Anderson et al. |
| 9,715,379 B2 | 7/2017 | He et al. |
| 2001/0056461 A1* | 12/2001 | Kampe ............... H04L 41/0856 709/201 |
| 2003/0120593 A1 | 6/2003 | Bansal et al. |
| 2008/0005733 A1 | 1/2008 | Ramachandran et al. |
| 2011/0145809 A1 | 6/2011 | Hwang |
| 2012/0284432 A1* | 11/2012 | Chen ..................... G06F 3/0607 710/17 |
| 2014/0007092 A1 | 1/2014 | Barbee et al. |
| 2015/0212908 A1* | 7/2015 | Andrews ............... G06F 11/302 714/4.11 |
| 2018/0241617 A1* | 8/2018 | Radzikowski .......... H04L 67/34 |

FOREIGN PATENT DOCUMENTS

| | | |
|---|---|---|
| CN | 103095742 A | 5/2013 |
| EP | 2498439 A1 | 9/2012 |

OTHER PUBLICATIONS

International Search Report to corresponding International Application No. PCT/CN2016/110722 dated Mar. 24, 2017 (2 pages).

* cited by examiner

METHOD AND APPARATUS FOR UPGRADING A DISTRIBUTED STORAGE SYSTEM

CROSS-REFERENCE TO RELATED APPLICATIONS

The disclosure claims priority to Chinese Patent Application No. 201511034171.7, filed on Dec. 31, 2015 and entitled "METHOD AND APPARATUS FOR UPGRADING DISTRIBUTED STORAGE SYSTEM," and PCT Appl. No. PCT/CN16/110722, filed on Dec. 19, 2016 and entitled "METHOD AND APPARATUS FOR UPGRADING DISTRIBUTED STORAGE SYSTEM," both of which are incorporated herein by reference in their entirety.

BACKGROUND

Technical Field

The disclosure relates to the field of distributed computer technology, and in particular, to methods and apparatuses for upgrading a distributed storage system.

Description of the Related Art

A high-availability distributed storage system is the cornerstone for building highly available services. The distributed storage system consists of distributed data servers and provides highly reliable data and high availability access. The high reliability is implemented through data redundant multi-backup or erasure codes and the high availability is implemented through rapid exception handling and failover. To perform version upgrades on the distributed storage system, each data server of the system needs to be restarted to complete the version update.

In current systems, upgrading a distributed storage system may be performed using the following solutions.

In a first solution, high-level services are disabled and the entire distributed storage system is stopped. All data servers of the distributed storage system are then restarted and upgraded. After all the data servers complete upgrade, the high-level services are restored. However, this solution makes all high-level services unavailable and this unavailability lasts for a significant period, which is not applicable for services that require high availability.

In a second solution, high-level services are not stopped; rather, each data server is restarted in a rolling manner. A client sends write requests to a plurality of data servers (the number of data servers being a default number of data servers requiring backup) to write to-be-written data to the data servers. If the requests fail, the client retries with the rest of the data servers to ensure access of the client. In this solution, however, if the client waits for recovery of the data servers and retries, this retry policy will significantly affect the response time of the servers because restart recovery of data servers generally requires multiple seconds, and highly real-time data access has a delay of 10 to 100 ms.

In a third solution, high-level services are not stopped; rather, each data server is restarted in a rolling manner. A client sends write requests to a plurality of data servers (the number of the plurality of data servers being a default number of data servers requiring backup) to write to-be-written data into the data servers. If the requests fail, the client retries, ignoring the failed data servers, so as to ensure access of the client. However, in this solution, even though the client temporarily ignores the failing data servers, the distributed storage system continues with the rolling upgrade of these data servers. If the data servers in the distributed storage system are restarted in a rolling manner too rapidly, if the client performs a successful write to only one data server so that only one data server has a successful write, and if the disk or machine of this data server is damaged during a rolling restart, user data is lost because the to-be-written data of the client is not written into other data servers. Even if the rolling restart time is extended, a large cluster of the distributed storage system has unexpected disk and machine exceptions during long-time rolling. Therefore, the situation where only one data server has a successful write of the data of the client still exists, bringing great risk of loss to the user data. Thus, although this solution solves the latency problem, the data reliability is low.

SUMMARY

In view of the aforementioned problems, embodiments of the disclosure are introduced to provide a method for upgrading a distributed storage system and a corresponding apparatus for upgrading a distributed storage system so as to overcome or at least partially solve the problems.

To solve the aforementioned problems, the disclosure discloses a method for upgrading a distributed storage system, applied to a client, and the method comprising: sending write requests to a plurality of data servers regarding the same to-be-written data; receiving responses returned by each of the plurality of data servers; determining, based on the responses, if a number of successful writes is greater than a pre-defined number; if the number of the successful writes is greater than the pre-defined number, sending first feedback information to each data server responding with a successful write; and if the number of the successful writes is not greater than the pre-defined number, sending second feedback information to each data server responding with a successful write, wherein the first feedback information or the second feedback information is used by the data server to determine its own state, the state comprising an upgradeable state and a non-upgradeable state, wherein the state of a data server is used by an upgrade control server to notify, in a rolling manner, the data server to perform an upgrade operation.

The disclosure further discloses a method for upgrading a distributed storage system, applied to a data server, and the method comprising: receiving first feedback information or second feedback information sent from a client, wherein the first feedback information or the second feedback information is obtained according to a comparison result of the number of successful writes to a pre-defined number after the client sends write requests regarding the same to-be-written data to a plurality of data servers. When a data server is non-upgraded, determining the data server's state according to the first feedback information or the second feedback information, wherein the state comprises an upgradeable state and a non-upgradeable state, and wherein the state is used by an upgrade control server to select and notify, in a rolling manner, the data server to perform an upgrade operation.

The disclosure further discloses a method for upgrading a distributed storage system, applied to an upgrade control server, and the method comprising: acquiring a state for each data server of a plurality of data servers, wherein the state comprises an upgradeable state and a non-upgradeable state, and each data server has one state, the state of the data server determined according to first feedback information or second feedback information, and the first feedback information or the second feedback information is obtained according to a comparison result of the number of successful writes to a pre-defined number after the client sends write requests regarding the same to-be-written data to a plurality of data servers; and notifying, in a rolling manner, at least one data server in an upgradeable state to perform an upgrade operation, wherein the data server performs the upgrade operation according to the notification.

The disclosure further discloses an apparatus for upgrading a distributed storage system, applied to a client, and the apparatus comprising: a request sending module, configured to send write requests regarding the same to-be-written data to a plurality of data servers; a determination module, configured to receive responses returned by each of the data servers and determine, based on the responses, if a number of successful writes is greater than a pre-defined number; a first feedback module, configured to send first feedback information to each data server having the successful write if the number of the successful writes is greater than the pre-defined number; a second feedback module, configured to send second feedback information to each data server having the successful write if the number of the successful writes is not greater than the pre-defined number, wherein the first feedback information or the second feedback information is used for the data server to determine its own state, the state comprising an upgradeable state and a non-upgradeable state, and the state of the data server is used by an upgrade control server to notify, in a rolling manner, the data server to perform an upgrade operation.

The disclosure further discloses an apparatus for upgrading a distributed storage system, applied to a data server, and the apparatus comprising: a feedback information receiving module, configured to receive first feedback information or second feedback information sent from a client, wherein the first feedback information or the second feedback information is obtained according to a comparison result of the number of successful writes to a pre-defined number after the client sends write requests regarding the same to-be-written data to a plurality of data servers; and a state determining module, configured to determine the data server's state according to the first feedback information or the second feedback information when the data server is non-upgraded, wherein the state comprises an upgradeable state and a non-upgradeable state, and the state is used for an upgrade control server to select and notify, in a rolling manner, the data server to perform an upgrade operation.

The disclosure further discloses an apparatus for upgrading a distributed storage system, applied to an upgrade control server, and the apparatus comprising: a state acquisition module, configured to acquire a state for each data server in a plurality of data servers, wherein the state comprises an upgradeable state and a non-upgradeable state, and each data server has one state, the state of the data server is determined according to first feedback information or second feedback information, and the first feedback information or the second feedback information is obtained according to a comparison result of the number of successful writes to a pre-defined number after the client sends write requests regarding the same to-be-written data to a plurality of data servers; and an upgrade notifying module, configured to notify, in a rolling manner, at least one data server in an upgradeable state to perform an upgrade operation, wherein the data server performs the upgrade operation according to the notification. The embodiments of the disclosure have the following advantages:

In the embodiments of the disclosure, after a distributed storage system starts an upgrade procedure, each client accessing the distributed storage system sends write requests regarding the same to-be-written data to a plurality of data servers at the same time. Each client then analyzes how many data servers the to-be-written data is successfully written into; determines whether the number of the successful writes is greater than a pre-defined number; and sends first feedback information or second feedback information to each data server having a successful write according to the determined result. The data server determines whether it is in an upgradeable or a non-upgradeable state according to the received first feedback information or second feedback information. According to the state of the data server, an upgrade control server may then select to notify, in a rolling manner, a data server to perform an upgrade operation. Through the aforementioned process, in the embodiments of the disclosure, when the upgrade control server controls the data servers to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss.

DETAILED DESCRIPTION OF THE EMBODIMENTS

To make the above-mentioned objectives, features and advantages of the disclosure more obvious and easy to understand, the disclosure is further described below in detail in conjunction with the accompanying figures and the specific implementations.

One of the core ideas of the disclosed embodiments is that creative changes are made to data servers and an upgrade control server of a distributed storage system, and new execution logic is also provided to clients accessing the data servers. After the distributed storage system starts an upgrade procedure, each client accessing the distributed storage system sends write requests regarding the same to-be-written data to multiple data servers at the same time. Then, the number of data servers that successfully the to-be-written data is analyzed. It is determined whether the number of the successful writes is greater than a pre-defined number. First feedback information or second feedback information is sent to each data server having a successful write according to the determination. The data server determines whether it is in an upgradeable or a non-upgradeable state according to the received first feedback information or second feedback information. According to the state of the data server, an upgrade control server may then select to notify, in a rolling manner, the data server to perform an upgrade operation. Through the aforementioned process, when the upgrade control server controls the data servers in an upgradeable state to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss; moreover, the process may tolerate unexpected exceptions in machines during upgrade, ensuring that the service is not affected.

The embodiments of the disclosure described below may be applied to a client.

Figure 1:
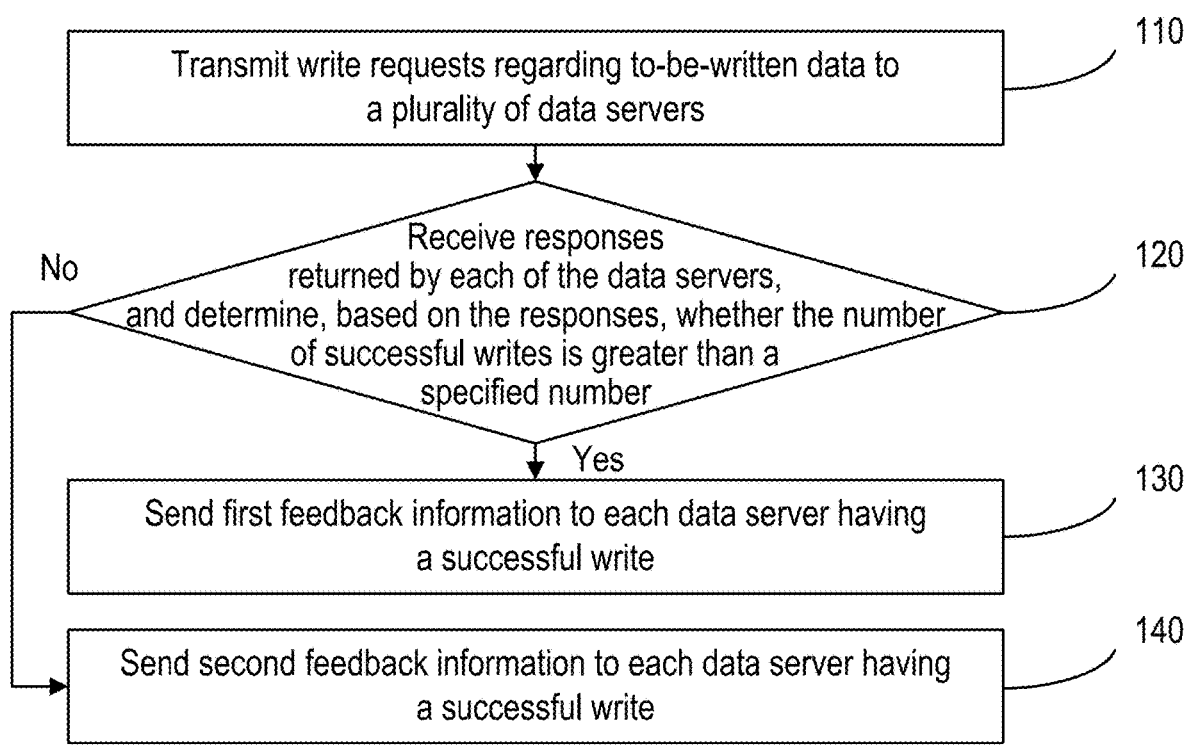
FIG. 1 is a flow diagram illustrating a method for upgrading a distributed storage system at a client side according to some embodiments of the disclosure.

FIG. 1 is a flow diagram illustrating a method for upgrading a distributed storage system according to some embodiments of the disclosure. The method may specifically include the following steps.

Step 110: Transmit write requests regarding to-be-written data to a plurality of data servers. In one embodiment, the to-be-written data is the same for each write request.

In this embodiment of the disclosure, when a client (A) intends to write data A1 to data servers during upgrade of the distributed storage system, the client A sends write requests regarding the data A1 to a plurality of data servers.

In this embodiment of the disclosure, the number R of the plurality of data servers may be preset, for example, to 10. The specific number R is not limited in the disclosure.

Then the client A may send write requests regarding the to-be-written data to R data servers, and then proceed to step 120.

It may be understood that in actual applications, the client A may send R write requests to a scheduling server of the distributed storage system first. Then the scheduling server controls which R data servers will be allocated with the R write requests.

It should be noted that when different clients send write requests to R data servers for to-be-written data thereof, the respective R data servers may be the same or different.

In another embodiment of the disclosure, before step 110, the method further includes steps 101 and 102.

Step 101: When accessing a data server, receive a second upgrade notification sent by the data server.

Step 102: Enter an upgrade preparation state according to the second upgrade notification.

In this embodiment of the disclosure, an upgrade control server of the distributed storage system first notifies each data server of entering an upgrade preparation state. Then each data server may send a second upgrade notification to the client accessing the data server, so that the client enters the upgrade preparation state.

Accordingly, after the client A accesses a data server entering the upgrade preparation state, the data server returns a second upgrade notification to the client. After receiving the second upgrade notification, the client enters the upgrade preparation state according to the second upgrade notification.

In this embodiment of the disclosure, if the client accesses the data server through a webpage of a browser, an upgrade script may be transmitted to the browser through the webpage opened by the browser. The browser may execute the script after receiving the script, so that the client enters the upgrade preparation state. If the client accesses the data server through a mobile application (e.g., the ALIPAY application), upgrade processing logic may be pre-added in the application. The upgrade processing logic is enabled after the application receives a second upgrade notification, so that the client enters the upgrade preparation state. Certainly, the specific manner is not limited in the disclosure.

When the client enters the upgrade preparation state, the flow may enter steps performed by the client such as steps 110, 120, 130, and 140 in one embodiment of the disclosure.

Step 120: Receive write responses returned by each of the data servers and determine whether the number of successful writes is greater than a pre-defined number according to the responses. If the number of the successful writes is greater than the pre-defined number, enter step 130. If the number of the successful writes is not greater than the pre-defined number, enter step 140.

In this embodiment of the disclosure, under normal circumstances, each data server correspondingly returns a response to the client after receiving the write request regarding the same to-be-written data sent by the client. Certainly, a certain data server being upgraded or breaking down will not return a response to the client.

In this embodiment of the disclosure, the client may periodically check received responses after sending the write requests regarding the to-be-written data A1 to the R data servers. For example, it is periodically checked whether a response is, or responses of a certain one or more data servers are, received. If a response or responses of a certain data server or certain data servers is not or are not received within a specified time period, it indicates that the to-be-written data A1 is not successfully written into the certain one or more data servers. If a response or responses of a certain data server or certain data servers is or are received within the specified time period, it may be determined whether the response is a successful write response or a failed write response.

If the response is a successful write response, it indicates that the data server corresponding to the successful write response successfully backs up, i.e., successfully writes, the to-be-written data A1. If the response is a failed write response, it indicates that the data server corresponding to the failed write response fails to back up, i.e., fails to write, the to-be-written data A1.

It should be noted that for the responses of the R data servers, the client A periodically checks whether M is greater than N (parameters M and N are described further herein). The period is, for example, 1 ms (microsecond). Certainly, the period may be decided according to needs and is not limited by the disclosure. Then, the number of successful writes of the to-be-written data A1 to the data servers may be computed based on the aforementioned determination.

In this embodiment of the disclosure, a pre-defined number of successful writes may be preset. The pre-defined number is the minimum number of successful writes and may also be understood as the number of data servers having successful backups of to-be-written data of a client. The pre-defined number is, for example, N, where N<R and N and R are both positive integers. In practice, it may be that N=3 and R=10 by default. Certainly, the values of N and R may be set according to actual needs and are not limited in the disclosure.

Then, after the client A sends the write requests to the R data servers for the current to-be-written data A1, if M data servers return successful write responses, it is determined if M>N. If M>N, the flow enters step 130. If M≤N, the flow enters step 140. M≥0 and M is an integer.

In actual application, data servers are placed on racks. Then the R data servers may be placed on different racks to further improve the effect of disaster recovery backup. Optimally, all the R data servers are placed on different racks.

Step 130: Send first feedback information to each data server having the successful write.

Since the write requests of the client can be successfully received and the to-be-written data therein can be backed up, it indicates that the M data servers are available. Then the client may send a first feedback message to the M data servers. The first feedback message may be, for example, an OK message, the OK message informing the data server that it can set its own state to upgradeable.

Figure 2:
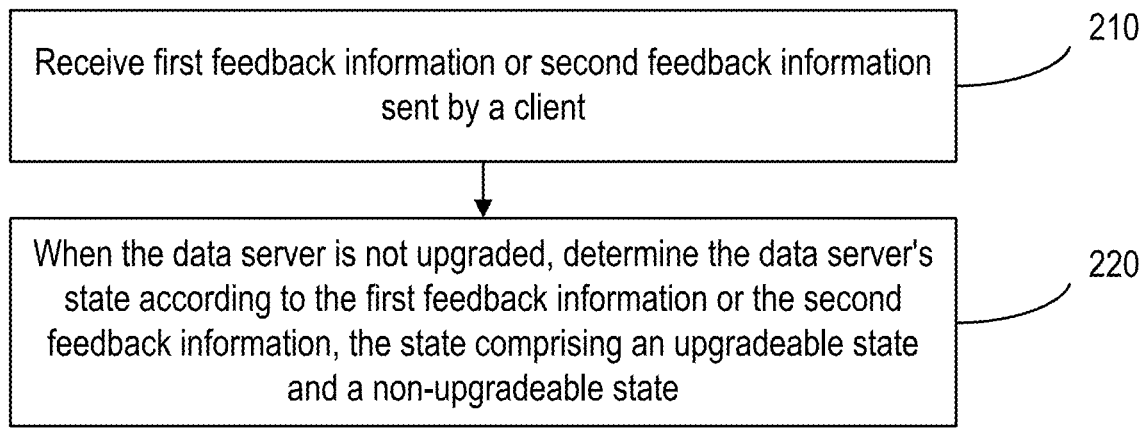
FIG. 2 is a flow diagram illustrating a method for upgrading a distributed storage system at a client side according to some embodiments of the disclosure.

In practice, how the data server sets its own state to upgradeable according to the first feedback message is described in detail in FIG. 2 of the disclosure.

Step 140: Send second feedback information to each data server having the successful write.

The first feedback information or the second feedback information is used for the data server to determine its own state. The state comprises an upgradeable state and a non-upgradeable state. The state of the data server is used by an upgrade control server to notify, in a rolling manner, the data server to perform an upgrade operation.

If M≤N, since the M data servers are available, the client may send a second feedback message to the M data servers. The second feedback message may be, for example, a HOLD heartbeat message, the HOLD message informing the data server that it can set its own state to non-upgradeable. In practice, how the data server sets its own state to non-upgradeable according to the second feedback message is described in detail in FIG. 2 of the disclosure.

It should be noted that for the situation that M<N, the client sends write requests to new data servers again until it is ensured that M is at least equal to N.

For each non-upgraded data server in the distributed storage system, when the data server receives the first feedback information or the second feedback information, the data server may determine whether it is in an upgradeable state or a non-upgradeable state according to the first feedback information or the second feedback information. The upgradeable state is, for example, OK; and the non-upgradeable state is, for example, HOLD. For example, if a certain data server receives the second feedback information, the data server may set its own state to non-upgradeable. If a certain data server receives the first feedback information, the data server may set its own state to upgradeable.

Certainly, in actual application, since high-level services are not stopped and data servers are continuously upgraded, the aforementioned R data servers may also include data servers that complete upgrade. Then for an upgraded data server, any aforementioned feedback information received by the data server will not be further processed; and the data server remains in an upgraded state.

The specific process of how the data server determines its own state according to the received first feedback information or second feedback information is described in detail in FIG. 2 of the disclosure.

Further, the state of each data server may be used for the upgrade control server to notify, in a rolling manner, the data server to perform an upgrade operation. The specific process of how the upgrade control server notifies, in a rolling manner, the data server to perform an upgrade operation is described in FIG. 3 of the disclosure.

In another embodiment of the disclosure, step 140 includes substeps 141 to 144.

Substep 141: If the number of the successful writes is equal to the pre-defined number, send the second feedback information to each data server having the successful write.

For example, the aforementioned client A sends the to-be-written data A1 to the R data servers for the first time. Then, if the monitored number of the successful write responses is M=N, the second feedback information can be directly sent to the M data servers having the successful writes.

Substep 142: If the number of the successful writes is less than the pre-defined number, send a write request regarding the to-be-written data to at least one data server other than the plurality of data servers.

Substep 143: Receive a response returned by the at least one data server, and determine whether the current number of successful writes is equal to the pre-defined number according to the response in combination with the previous number of the successful writes. If the current number of the successful writes is equal to the pre-defined number, the flow enters sub step 144. If the current number of the successful writes is less than the pre-defined number, the flow enters sub step 142.

Substep 144: If the number of the successful writes is equal to the pre-defined number, send the second feedback information to each data server having the successful write.

Regarding substeps 142 to 144 in which the client A sends the to-be-written data A1 to the R data servers for the first time, if the number of the successful responses monitored is M<N, write requests are once again sent to at least (N−M) data servers. Responses of the (N−M) data servers are then received and the number of successful write responses returned by the (N−M) data servers is added to the previous number of the successful write responses of the R data servers to obtain M. If M=N at this time, the second feedback information is sent to each data server having the successful write. The value of M changes at this time, but if M is still less than N at this time, write requests are sent to at least (N−M) data servers again. The process continues until M=N, then the second feedback information is sent to each data server having a successful write.

Further, in the case that R=10, N=5, and the client A sends the to-be-written data A1 to 10 data servers for the first time, if the number of successful write responses monitored is M=3, write requests are once again sent to at least (5−3=2) data servers. The number of successful write responses of the 2 data servers is further monitored; and it is found that only 1 successful write response is received, and then 1 is added to the previously recorded 3 to obtain M=4. Then a write request is once again sent to at least (5−4=1) data server. Monitoring and determination are further performed in the aforementioned manner. When M=N=5, the second feedback information is sent to each data server having a successful write. In actual application, when M<N, in the aforementioned process, the second feedback message may be sent to a data server having a successful write directly each time a write request is sent, without waiting until M=N and sending them together.

Certainly, in actual application, since the responses of the data servers are periodically checked, if it is further determined that M<N in a specified period T, for example, 3*T, write requests are once again sent to at least (N−M) data servers. Such determination is made on M and N in each cycle. In general, it can be determined that M=N after several cycles; the response time is short in general, which does not have much influence on the response delay of the client. From a user's perspective, a much shorter response delay in the aforementioned situation than that in waiting for restart can be seen.

In this way, it ensures a successful backup of to-be-backed up data of a client in multiple databases without affecting normal use of uploading services.

In another embodiment of the disclosure, after step 140, the method further includes step 150.

Step 150: When new to-be-written data appears, the plurality of data servers comprising the data servers having the successful writes earlier are used as objects and enter step 120.

It may be understood that for the situation that M=N, since the client returns HOLD heartbeat information to each data server having a successful write, these data servers set themselves to a non-upgradeable state, for example, a HOLD state. To remove the limitation of the client on these data servers more conveniently, in this embodiment of the disclosure, the client subsequently sends write requests regarding new to-be-written data to the previous R data servers.

For example, for the to-be-written data A1 of the client A, write requests are previously sent to 10 data servers U1, U2, . . . , U10 and it is determined that M=N, then for to-be-written data A2 of the client A, write requests may be further sent to the 10 data servers U1, U2, . . . , U10; and the determining in step 120 continues.

It may be understood that for substep 142, the R data servers include M data servers having successful writes, and then the remaining (R-M) data servers are selected from data servers having failed writes. For example, R=10 and N=3, and for the to-be-written data A1 of the client A, write requests are sent to the 10 data servers U1, U2, . . . , U10 for the first time; and only U1 and U2 have successful writes; and then write requests are sent to U11 and U12 for the second time, and U11 has a successful write; then for the to-be-written data A2 of the client, 10 data servers U1, U2, U11, U4, U5, . . . , U10 may be selected, and write requests are sent to the 10 data servers; certainly, 10 data servers consisting of U1, U2, U11, and other data servers may also be selected.

Then, when the number of successful writes of the to-be-written data A2 of the client A is M>N, an OK message may be sent to each data server having a successful write; and the data server may determine whether to change its own state to upgradeable according to the OK message.

In this way, in the situation that M<N, a client may again write to-be-written data into the same R data servers to actively update the states of the data servers, so that the time in which the data servers are in a non-upgradeable state can be reduced.

In another embodiment of the disclosure, the first feedback information and the second feedback information include a client identifier.

For example, for the client A, when sending the first feedback information or the second feedback information to the server, the first feedback information and the second feedback information both include a client identifier "Client A".

Then the first feedback information or the second feedback information being used by the data server to determine its own state comprises: after receiving the second feedback information, the second feedback information being used for the data server to write the client identifier in the second feedback information into a non-upgradeable list and mark its own state as non-upgradeable.

In this embodiment of the disclosure, a non-upgradeable list is set on the data server side. Using the client A as an example, after receiving the second feedback information of the client A, the data server sets its own state to the non-upgradeable state and writes the client A into the non-upgradeable list.

After the data server receiving the first feedback information, the first feedback information is used by the data server to delete the client identifier in the first feedback information from the non-upgradeable list, and mark its own state as upgradeable after determining that the non-upgradeable list is empty.

In this embodiment of the disclosure, after the step is performed, the client A sends the second feedback information to each data server having the successful write, new to-be-written data appears; and a plurality of data servers including the previous data servers having the successful writes are used as objects. Then the data server receiving the second feedback message sent by the client A will subsequently receive a message sent by the client A. Then, when the message of the client A further received by the data server is the first feedback message, the record of the client A may be deleted from the non-upgradeable list.

Certainly, in actual applications, the data server receives the first feedback message of a certain client; and a corresponding client identifier may not be recorded in the non-upgradeable list. If so, the deletion process does not need to be performed.

Then, when the data server determines that the non-upgradeable list is empty, the data server sets its own state to upgradeable.

Certainly, in this embodiment of the disclosure, the client may further receive an exit notification of exiting the upgrade preparation state sent by the data server, and exit the upgrade preparation state according to the exit notification. Then the client sends a write request to the data server according to normal request sending logic.

In this embodiment of the disclosure, a method for upgrading a distributed storage system in the disclosure is introduced from a client side; each client sends write requests regarding the same to-be-written data to a plurality of data servers at the same time; then how many data servers have successful writes are analyzed; it is determined whether the number of the successful writes is greater than a pre-defined number; and first feedback information or second feedback information is sent to each data server having a successful write according to the determining result. After the data server receiving the first feedback information, the first feedback information being used for the data server to delete the client identifier in the first feedback information from the non-upgradeable list, and mark its own state as upgradeable after determining that the non-upgradeable list is empty. Therefore, in the embodiments of the disclosure, when the upgrade control server controls the data servers to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss.

This embodiment of the disclosure is applied to a data server side of a distributed storage system.

FIG. 2 is a flow diagram illustrating a method for upgrading a distributed storage system according to some embodiments of the disclosure. The method may specifically include the following steps.

Step 210: Receive first feedback information or second feedback information sent from a client, wherein the first feedback information or the second feedback information is obtained according to a comparison result of the number of successful writes to a pre-defined number after the client sends write requests regarding the same to-be-written data to a plurality of data servers.

With reference to the description of the client side in FIG. 1, after the client sends write requests regarding the to-be-written data A1 to R data servers, when the number M of successful writes is greater than the pre-defined number N, a first feedback message will be sent to the M data servers. When M is equal to N, a second feedback message will be sent to the M data servers. When M<N, a write request regarding the to-be-written data A1 is sent to at least one data server other than the plurality of data servers. Then a response returned by the at least one data server is received, and it is determined whether the current number M of all successful writes is equal to the pre-defined number N according to the response in combination with the previous number of successful writes. If M=N, second feedback information is sent to the M data servers. Reference may be made to the description in FIG. 1 for the specific process in which the client returns the first feedback information and the second feedback information, which will not be described herein again.

Relatively speaking, each data server in the distributed storage system may receive the first feedback information, such as an OK message, returned by each client. Or, the second feedback message, such as a HOLD message, returned by each client may be received.

In one embodiment, before step 210, the method further includes the following steps.

Step 201: Receive a first upgrade notification sent by an upgrade control server.

Step 202: Enter an upgrade preparation state according to the first upgrade notification, and send a second upgrade notification to the client after receiving an access request of the client, so that the client enters the upgrade preparation state.

In this embodiment of the disclosure, an upgrade control server of the distributed storage system first sends a first upgrade notification to each data server. Accordingly, each data server receives the first upgrade notification and then enters an upgrade preparation state according to the first upgrade notification.

Then for access to the data server entering the upgrade preparation state, after an access request of a certain client is received, a second upgrade notification is returned to the client. The client then enters the upgrade preparation state according to the second upgrade notification.

When the data server enters the upgrade preparation state, the flow may enter steps performed by the data server such as steps 210 and 220 in this embodiment of the disclosure.

Step 220: When the data server is non-upgraded, determine the data server's state according to the first feedback information or the second feedback information, wherein the state comprises an upgradeable state and a non-upgradeable state.

The state is used by the upgrade control server to select to notify, in a rolling manner, the data server to perform an upgrade operation.

In actual application, when all the data servers have just entered the upgrade preparation state, each data server is not upgraded. However, as some data servers are upgraded continuously, these data servers are in an upgraded state. For example, a successfully upgraded data server sets its own state to DONE; and at this time, the successfully upgraded data server also receives first feedback information or second feedback information. The data server, however, does not further process the first feedback information or the second feedback information and remains in an upgraded state.

Only a data server in a non-upgraded state determines the data server's own state according to the first feedback information or the second feedback information.

It may be understood that for each non-upgraded data server in the distributed cluster, when the data server receives the first feedback information or the second feedback information, the data server may determine whether it is in an upgradeable state or a non-upgradeable state according to the first feedback information or the second feedback information. The upgradeable state is, for example, OK; and the non-upgradeable state is, for example, HOLD. For example, if a certain data server receives the second feedback information, the data server may set its own state to non-upgradeable. If a certain data server receives the first feedback information, the data server may set its own state to upgradeable.

In another embodiment of the disclosure, the first feedback information and the second feedback information include a client identifier. Then based on step 150 in FIG. 1, step 220 may include substeps 221 to 222:

Substep 221: Upon receiving the second feedback information, write the client identifier in the second feedback information into a non-upgradeable list and mark its own state as non-upgradeable.

In this embodiment of the disclosure, a non-upgradeable list is preset in each data server and is used for recording information such as an identifier of a client sending a HOLD message.

For example, a client A sends write requests regarding to-be-written data A1 to a plurality of data servers, wherein data servers U1, U2, U3 have successful writes. When M=N, the client sends a HOLD message to M corresponding data servers. The HOLD message includes a HOLD instruction and a client identifier. Then the M data servers record the client A in a non-upgradeable list upon receiving the HOLD message. Certainly, a current time may be correspondingly recorded.

For example, a client B sends write requests regarding to-be-written data B1 to a plurality of data servers, wherein the plurality of data servers also include the data server U1 and M=N. Then the non-upgradeable list of the data server U1 further records the client B. Certainly, a current time may also be recorded.

An example of the record of the non-upgradeable list of the data server U1 is shown in Table 1:

TABLE 1

| Client Identifier | Time |
| --- | --- |
| Client A | 2015.10.01, 10:00:00:00 |
| Client B | 2015.10.01, 12:01:00:00 |

For a HOLD message again sent by the same client, the non-upgradeable list may record only one client identifier corresponding to the client, or may record multiple client identifiers corresponding to the client. In actual application, for a HOLD message sent by the same client at different times, only one client identifier may be recorded; and then the respective time is recorded in a time field.

After the HOLD message is received, the data server's own state is further changed to a HOLD state, indicating that the data server is non-upgradeable.

In one embodiment, after substep 221, the method further includes substep B21.

Substep B21: For a client identifier in the non-upgradeable list, determining whether a second feedback message of a corresponding client is not received within a pre-defined number of time periods, and if the second feedback message of the corresponding client is not received within the pre-defined number of time periods, delete the client identifier from the non-upgradeable list.

In this embodiment of the disclosure, a time period T1 may be preset; and for a client corresponding to a client identifier in the non-upgradeable list, if the data server does not receive a HOLD message again sent by the client within a pre-defined number of time periods, the record of the client identifier in the non-upgradeable list is deleted.

For example, for Table 1 of the aforementioned data server U1, if the HOLD message of the client A is not received within the time of 3*T1, the record of the client A in Table 1 is deleted.

This step can prevent the data server from staying in the non-upgradeable state all the time after entering the non-upgradeable state.

Substep 222: Upon receiving the first feedback information, delete the client identifier in the first feedback information from the non-upgradeable list, and mark its own state as upgradeable after determining that the non-upgradeable list is empty.

For example, the aforementioned data server U1 receives an OK message again sent by the client A; then the record of the client A is deleted from Table 1. When Table 1 is empty after the data server deletes all the records in Table 1, the data server sets its own state to upgradeable.

In another embodiment of the disclosure, substep 222 includes substeps B11 to B14.

Substep B11: Determine whether the non-upgradeable list contains the client identifier in the first feedback information; and if so, enter substep B12.

Substep B12: Delete the client identifier from the non-upgradeable list.

Since one data server may be allocated to different clients for use, first feedback information of different clients may be received. Then based on the received first feedback information of a certain client, it is determined whether the non-upgradeable list contains a client identifier of the first feedback information. If the non-upgradeable list contains the client identifier of the first feedback information, the client identifier is deleted from the non-upgradeable list. If the non-upgradeable list does not contain the client identifier of the first feedback information, subsequent operation may not be performed.

For example, for the aforementioned data server U1, if an OK message sent by the client A once again is received and the OK message including a client identifier, the client identifier may be used for matching with the client identifiers in Table 1. When it is found that the client A exists, and then the record of the client A is cleared. If an OK message sent by a client C is received, and it is found that the client C is not recorded in Table 1, and then no operation is performed.

The aforementioned steps facilitate the data server on managing its own upgrade state with simple logic.

Substep B13: Determine whether the non-upgradeable list is empty; and if so, enter substep B14. If the non-upgradeable list is not empty, the data server maintains its own state as non-upgradeable.

Substep B14: Mark its own state as upgradeable.

If the non-upgradeable list is not empty, the data server maintains its own state as non-upgradeable.

For example, in the aforementioned example, the data server U1 first receives the OK message sent by the client A, clears the record of the client A, and determines that Table 1 is still not empty. Therefore the data server U1 remains in the HOLD state. If an OK message of the client B is then received, the record of the client B in Table 1 is deleted in substep 221 and, at this time, it is determined that Table 1 is empty. Then the data server U1 changes its own HOLD state to an OK state, indicating that the data server U1 is upgradeable.

Then according to the state of each data server, the upgrade control server may select to notify, in a rolling manner, the data server to perform an upgrade operation. Reference may be made to the description in FIG. 3 for the process in which the upgrade control server specifically controls upgrade of each data server.

In this embodiment of the disclosure, the data server may surely further receive an exit notification of exiting the upgrade preparation state that is sent by the upgrade control server, and exit the upgrade preparation state according to the exit notification. Meanwhile, the data server may send an exit notification to the client according to the exit notification so that the client exits the upgrade preparation state. Then the data server processes a write request of the client according to normal processing logic.

In this embodiment of the disclosure, a method for upgrading a distributed storage system in the disclosure is introduced at a data server side. The data server determines whether it is in an upgradeable or a non-upgradeable state according to the received first feedback information or second feedback information sent by a client. The first feedback information or the second feedback information is obtained according to a comparison result of the number of successful writes to a pre-defined number after the client sends write requests regarding the same to-be-written data to a plurality of data servers; the state includes an upgradeable state and a non-upgradeable state; and the state is used by an upgrade control server to select and notify, in a rolling manner, the data server to perform an upgrade operation. Therefore, the client control the states of the data servers, which ensures that to-be-written data of any client is written into at least a pre-defined number of data servers for backup. When the upgrade control server controls each data server to upgrade in a rolling manner, high-level services do not need to be stopped. Further, a shorter response time of the distributed storage system to the client can be ensured, improving data reliability and significantly reducing the risk of user data loss.

Figure 3:
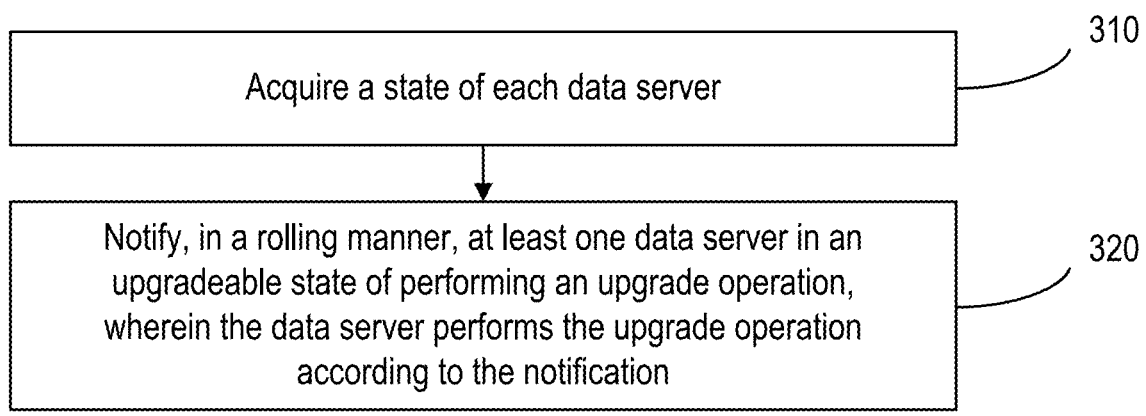
FIG. 3 is a flow diagram illustrating a method for upgrading a distributed storage system at an upgrade control server side according to some embodiments of the disclosure.

FIG. 3 is a flow diagram illustrating a method for upgrading a distributed storage system according to some embodiments of the disclosure. The method may specifically include the following steps.

Step 310: Acquire a state of each data server, wherein the state includes an upgradeable state and a non-upgradeable state, and each data server has one state. The state of the data server is determined according to the first feedback information or second feedback information and the first feedback information or the second feedback information is obtained according to a comparison result of the number of successful writes to a pre-defined number after the client sends write requests regarding the same to-be-written data to a plurality of data servers.

With reference to the description in FIG. 1 and FIG. 2, each data server in the distributed storage system may determine its state according to a first feedback message and/or a second feedback message fed back by a client, wherein the state includes an upgradeable state and a non-upgradeable state.

Each data server can have only one state at a time. For example, if a certain data server is in an upgradeable state, the data server cannot have other states. The same is true for other situations, which will not be described herein again.

Then an upgrade control server in this embodiment of the disclosure can acquire the state of each data server.

There may be many specific acquisition methods for the upgrade control server to acquire the state of the data server, which are not limited in the disclosure.

Step 320: Notify, in a rolling manner, at least one data server in an upgradeable state to perform an upgrade operation, wherein the data server performs the upgrade operation according to the notification.

In this embodiment of the disclosure, since each data server sets its own state according to feedback information of the client, the upgrade control server may control, in a rolling manner, data servers in an upgradeable state to perform an upgrade operation.

For example, a batch of upgradeable data servers is selected each time and this batch of data servers is notified to perform an upgrade operation. This batch of data servers may be restarted and upgraded after receiving an upgrade notification.

In another embodiment of the disclosure, step 320 includes substeps 321 to 322.

Substep 321: Select at least one data server in an upgradeable state each time, and notify the at least one data server in the upgradeable state to perform the upgrade operation.

For example, data servers in an upgradeable state include U1, U2, U3, U10, U11 . . . U20, etc. Then the upgrade control server may select K data servers, for example, select 3 data servers therefrom each time and notify them to perform an upgrade operation. K is an integer greater than 0. Certainly, K may be set according to actual needs, which is not limited by the disclosure.

Substep 322: Monitor whether the at least one data server in the upgradeable state finishes the upgrade operation fully; and if so, enter substep 321.

For example, the upgrade control server notifies the aforementioned data servers U1, U2, and U3 to perform an upgrade operation; then the data servers U1, U2, and U3 are restarted and upgraded. After the data servers are successfully upgraded, they can change their own states to an upgraded state, for example, DONE.

Then the upgrade control server may monitor whether the states of these data servers are DONE; and if so, the upgrade is successful.

Certainly, in actual application, one or more data servers may have a failed upgrade during upgrade of this batch of data servers. The upgrade control server then monitors whether the data server has a successful upgrade or failed upgrade. In actual applications, a failed upgrade may be determined if the following situation takes place: a failed machine restart or an unchanged system version after restart.

It should be noted that the aforementioned finishing the upgrade operation may include both a successful upgrade and a failed upgrade. The finishing the upgrade operation fully includes: all the data servers are successfully upgraded; and if only some data servers are successfully upgraded, the remaining data servers fail in upgrading.

If the states of U1, U2, and U3 are all DONE, the flow enters the step of selecting at least one data server in an upgradeable state for the next round, and notifying the at least one data server in the upgradeable state to perform the upgrade operation.

When the upgrade control server monitors that all the data servers notified by the upgrade control server have finished the upgrade operation fully, the upgrade control server may select, in a rolling manner, the next batch of data servers for upgrade from data servers in an upgradeable state.

In this way, excessively frequent rolling is avoided and the risk of data loss is reduced.

In another embodiment of the disclosure, after the data server performs the upgrade operation, the method further includes the following step.

Sub step 323: If it is monitored that a result of the upgrade operation of any data server is a failed upgrade, add the data server into an upgrade blacklist and suspend upgrade of the data server.

If a certain data server fails to upgrade, the upgrade control server adds the data server into an upgrade blacklist and suspends upgrade of the data server. These data servers then wait to go offline or wait for manual repair.

In one embodiment, the plurality of data servers in this embodiment of the disclosure may be placed on at least two racks. In actual application, various data servers in the distributed storage system may certainly be placed on multiple racks with one rack for one data server sub-cluster.

Further, step 320 includes sub step C11.

Substep C11: Select a rack having the most data servers that are in an upgradeable state each time, and notify the data servers in the rack to perform an upgrade operation, wherein each data server in the rack checks its own state according to the notification. If a data server is in an upgradeable state, the data server is restarted and upgraded; and if a data server is in a non-upgradeable state or an upgrade-finished state, the data server declines to restart and upgrade.

In this embodiment of the disclosure, the data servers are placed on racks, and a batch of data servers is placed on one rack. However, for a large number of clients, they may access different data servers of different racks. Each rack may have a data server in an upgradeable state, may have a data server in a non-upgradeable state, or may have a data server that finishes upgrade.

To make it convenient for the upgrade control server to send an upgrade notification, in this embodiment of the disclosure, an upgrade notification is sent using racks as units. For example, an IP segment of a rack is 200.200.200.*; and the upgrade control server in this embodiment of the disclosure needs to generate one notification for 200.200.200.* and broadcast it to the rack, so that each data server of the rack can receive the notification.

Then after the data server in the rack receives the aforementioned upgrade notification, the data server first determines whether its own state is OK. If the state is OK, the data server is restarted and upgraded. If the state is HOLD or DONE instead, the data server declines to restart and upgrade.

In this embodiment of the disclosure, to quickly finish upgrade, a rack having the most data servers that are in an OK state is selected; and an upgrade notification is sent to the rack.

For example, data servers in an upgradeable state include U1, U2, U3, U10, U11 . . . U20, and so on. Then K data servers for example, 3 data servers, may be selected therefrom each time and being notified to perform an upgrade operation.

In one embodiment, after substep C11, the method further includes substep C12.

Substep C12: Monitor whether the data servers in the rack finish the upgrade operation fully; and if so, enter the upgrade notifying submodule.

Then, when it is monitored that the upgrade operation of the data servers in the upgradeable state in the rack is all finished, a next rack may be selected; and an upgrade notification is sent to data servers of the next rack. That cycle repeats until all the data servers finish upgrade.

Through the aforementioned process, when the upgrade control server monitors that all data servers finish upgrade except those data servers having failed upgrades, the upgrade control server may notify each data server of exiting the upgrade preparation state and return to normal processing logic. Each data server then notifies a client accessing the data server of exiting the upgrade preparation state. The client then returns to normal processing logic. Steps 310 and 320 do no need to be performed.

In this embodiment of the disclosure, a method for upgrading a distributed storage system in the disclosure is introduced at an upgrade control server side. When the upgrade control server controls the data servers to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss. Moreover, the method can tolerate unexpected exceptions in machines during upgrade, ensuring that the service is not affected. Additionally, a rapid upgrade is achieved without having to migrate massive data.

Figure 4:
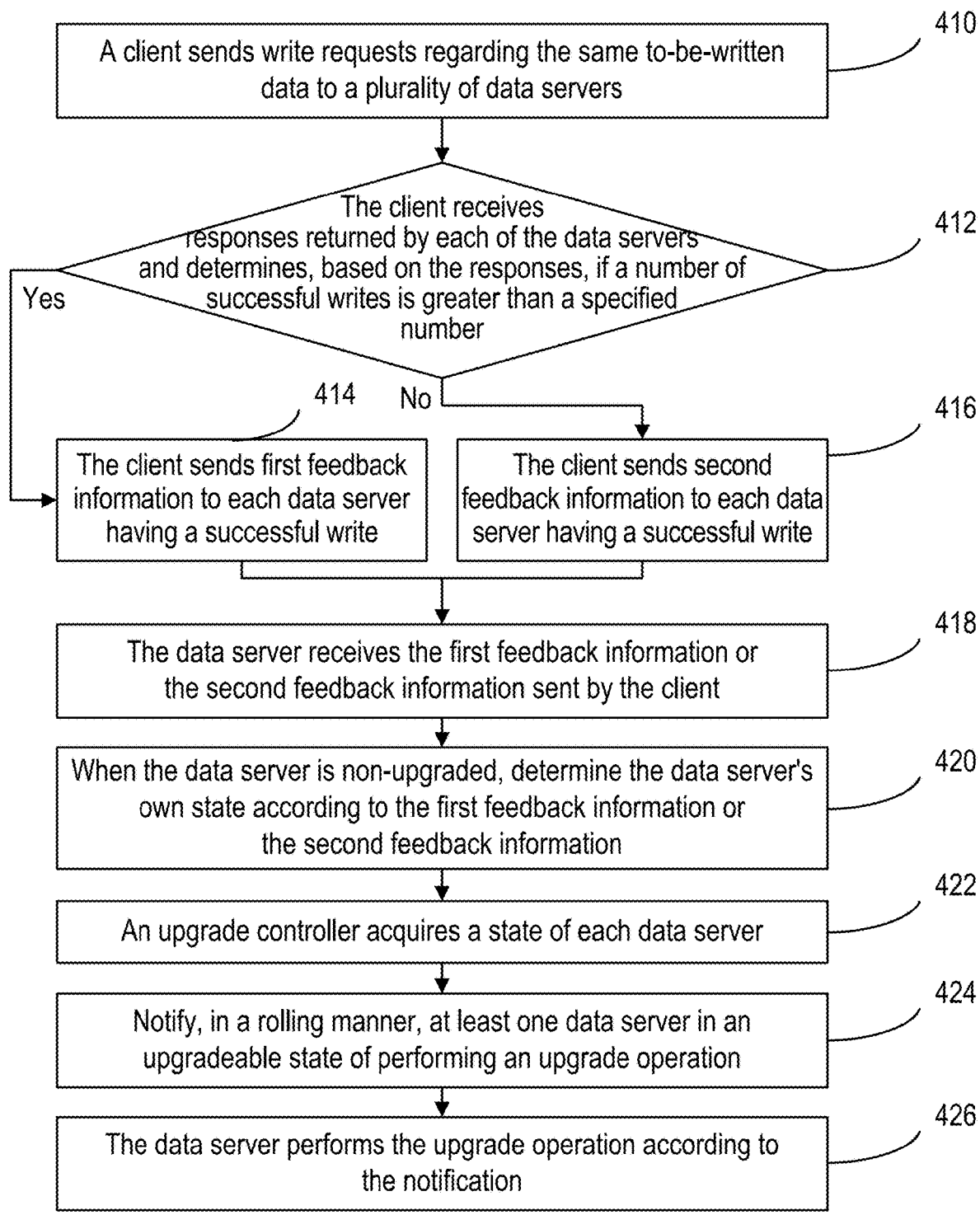
FIG. 4 is a flow diagram illustrating a method for upgrading a distributed storage system according to some embodiments of the disclosure.

FIG. 4 is a flow diagram illustrating a method for upgrading a distributed storage system according to some embodiments of the disclosure. The method may specifically include the following steps.

Step 410: A client sends write requests to a plurality of data servers regarding the same to-be-written data.

Step 412: The client receives responses returned by each of the data servers and determines whether the number of successful writes is greater than a pre-defined number according to the responses. If the number of the successful writes is greater than the pre-defined number, enter step 414. If the number of the successful writes is not greater than the pre-defined number, enter step 416.

Step 414: The client sends first feedback information to each data server having the successful write.

Step 416: The client sends second feedback information to each data server having the successful write.

In another embodiment of the disclosure, the first feedback information and the second feedback information include a client identifier. After the step of sending second feedback information to each data server having the successful write, the method further includes the following steps.

Step 417 (not illustrated): When new to-be-written data appears, the plurality of data servers comprising the data servers having the successful writes earlier are used as objects and write requests regarding the same to-be-written data are sent to the plurality of data servers.

Step 418: The data server receives the first feedback information or the second feedback information sent by the client.

Step 420: In the situation where the data server is non-upgraded, determine the data server's state according to the first feedback information or the second feedback information, wherein the state comprises an upgradeable state and a non-upgradeable state.

In one embodiment, based on step 417, the step 420 includes substeps D11 to D16.

Substep D11: Upon receiving the second feedback information, write the client identifier in the second feedback information into a non-upgradeable list and mark its own state as non-upgradeable.

Substep D12: For a client identifier in the non-upgradeable list, determine whether a second feedback message of a corresponding client is not received within a pre-defined number of time periods, and if the second feedback message of the corresponding client is not received within the pre-defined number of time periods, enter substep D13. If the second feedback message of the corresponding client is received within the pre-defined number of time periods, the non-upgradeable state is maintained.

Substep D13: Delete the client identifier from the non-upgradeable list. Enter substep D15.

Substep D14: Determine whether the non-upgradeable list contains the client identifier in the first feedback information; and if so, enter substep D13. If the non-upgradeable list does not contain the client identifier in the first feedback information, the flow enters substep D15.

Substep D15: Determine whether the non-upgradeable list is empty; and if so, enter substep D16.

Substep D16: Mark its own state as upgradeable.

Step 422: An upgrade control server acquires a state of each data server.

Step 424: The upgrade control server notifies in a rolling manner, at least one data server in an upgradeable state to perform an upgrade operation.

Step 426: The data server performs the upgrade operation according to the notification.

Certainly, in this embodiment, reference may be made to the description in FIG. 1 for the principle of the steps at the client side; reference may be made to the description in FIG. 2 for the principle of the steps at the data server side; and reference may be made to the description in FIG. 3 for the principle of the steps at the upgrade control server side. The description will not be provided herein again.

In this embodiment of the disclosure, a method for upgrading a distributed storage system in the disclosure is introduced in three aspects including a client, a data server, and an upgrade control server. For clients accessing the distributed storage system, each client sends write requests regarding the same to-be-written data to a plurality of data servers at the same time; then how many data servers have successful writes are analyzed; it is determined whether the number of the successful writes is greater than a pre-defined number; and first feedback information or second feedback information is sent to each data server having a successful write according to the determining result. The data server determines whether it is in an upgradeable or a non-upgradeable state according to the received first feedback information or second feedback information. The upgrade control server may control, in a rolling manner, data servers in the upgradeable state to perform an upgrade operation. Through the aforementioned process, when the upgrade control server controls the data servers in an upgradeable state to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss; Moreover, the method can tolerate unexpected exceptions in machines during upgrade, ensuring that the service is not affected.

Figure 5:
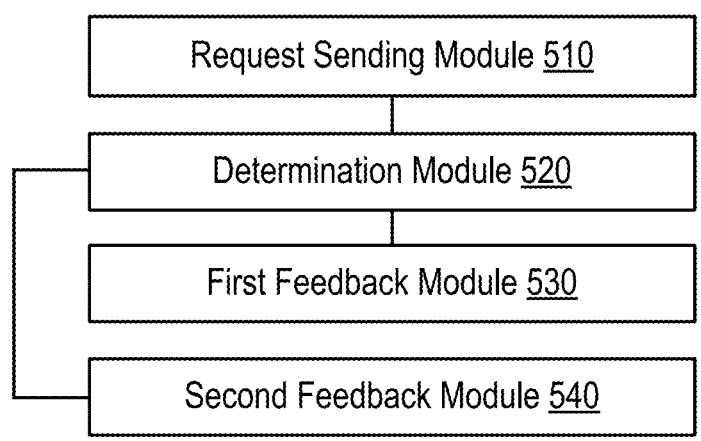
FIG. 5 is a block diagram of an apparatus for upgrading a distributed storage system at a client side according to some embodiments of the disclosure.

FIG. 5 is a block diagram of an apparatus for upgrading a distributed storage system according to some embodiments of the disclosure. The apparatus may specifically include the following modules: a request sending module 510, a determination module 520, a first feedback module 530, and a second feedback module 540.

The request sending module 510 is configured to send write requests regarding the same to-be-written data to a plurality of data servers.

In another embodiment of the disclosure, in addition to request sending module 510, the apparatus further includes: a second upgrade notification receiving module, configured to, when accessing a data server, receive a second upgrade notification sent by the data server; and a second upgrade preparation module, configured to enter an upgrade preparation state according to the second upgrade notification.

The determination module 520 is configured to receive responses returned by each of the data servers and determine, based on the responses, if a number of successful writes is greater than a pre-defined number.

The first feedback module 530 is configured to, if the number of the successful writes is greater than the pre-defined number, send first feedback information to each data server having the successful write.

The second feedback module 540 is configured to do the following: if the number of the successful writes is not greater than the pre-defined number, send second feedback information to each data server having the successful write, wherein the first feedback information or the second feedback information is used for the data server to determine its own state, the state comprises an upgradeable state and a non-upgradeable state; the state of the data server is used by an upgrade control server to notify, in a rolling manner, the data server to perform an upgrade operation.

In another embodiment of the disclosure, the second feedback module 540 includes: a second feedback information sending submodule, configured, if the current number of the successful writes is equal to the pre-defined number, send the second feedback information to each data server having the successful write; a write request sending submodule, configured to, if the number of the successful writes is less than the pre-defined number, send a write request regarding the to-be-written data to at least one data server other than the plurality of data servers; and a determination submodule, configured to receive a response returned by the at least one data server, and determine whether the current number of successful writes is equal to the pre-defined number according to the response in combination with the previous number of the successful writes; and if the current number of the successful writes is equal to the pre-defined number, enter the second feedback information sending submodule; write the client identifier in the second feedback information into a non-upgradeable list and mark its own state as non-upgradeable;

After the data server receives the first feedback information, the first feedback information being used for the data server to delete the client identifier in the first feedback information from the non-upgradeable list, it marks its own state as upgradeable after determining that the non-upgradeable list is empty.

Figure 6:
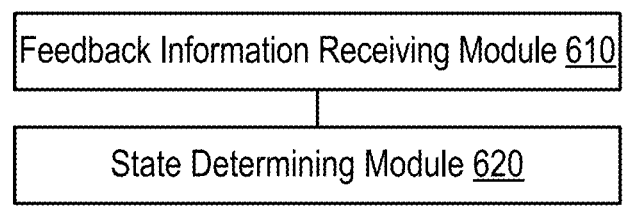
FIG. 6 is a block diagram of an apparatus for upgrading a distributed storage system at a client side according to some embodiments of the disclosure.

FIG. 6 is a block diagram of an apparatus for upgrading a distributed storage system according to some embodiments of the disclosure. The apparatus may specifically include the following modules: a feedback information receiving module 610 and a state determining module 620.

The feedback information receiving module 610 is configured to receive first feedback information or second feedback information sent from a client, wherein the first feedback information or the second feedback information is obtained according to a comparison result of the number of successful writes to a pre-defined number after the client sends write requests regarding the same to-be-written data to a plurality of data servers.

In another embodiment of the disclosure, in addition to the feedback information receiving module 610, the apparatus further includes: a first upgrade notification receiving module, configured to receive a first upgrade notification sent by the upgrade control server; and a first upgrade preparation module, configured to enter an upgrade preparation state according to the first upgrade notification, and send a second upgrade notification to the client after receiving an access request of the client, so that the client enters the upgrade preparation state.

The state determining module 620 is configured to do the following: in the situation where the data server is non-upgraded, determine the data server's state according to the first feedback information or the second feedback information, wherein the state comprises an upgradeable state and a non-upgradeable state; and the state is used for an upgrade control server to select and notify, in a rolling manner, the data server to perform an upgrade operation.

In another embodiment of the disclosure, the state determining module 620 includes an upgradeable determining submodule and a non-upgradeable state determining submodule.

The upgradeable determining submodule is configured to do the following: upon receiving the first feedback information, delete the client identifier in the first feedback information from the non-upgradeable list, and mark its own state as upgradeable after determining that the non-upgradeable list is empty.

In one embodiment, the upgradeable determining submodule includes a client identifier determining submodule configured to determine whether the non-upgradeable list contains the client identifier in the first feedback information; and if so, enter a first deleting submodule; the first deleting submodule, configured to delete the client identifier from the non-upgradeable list; a non-upgradeable list determining submodule configured to determine whether the non-upgradeable list is empty; and if so, enter an upgradeable marking submodule; and the upgradeable marking submodule is further configured to mark its own state as upgradeable.

The non-upgradeable state determining submodule is configured to write the client identifier in the second feedback information into a non-upgradeable list upon receiving the second feedback information and mark its own state as non-upgradeable.

In another embodiment of the disclosure, in addition to the non-upgradeable state determining submodule, the apparatus further includes a time determining submodule, configured to do the following: for a client identifier in the non-upgradeable list, determine whether a second feedback message of a corresponding client is not received within a pre-defined number of time periods, and if the second feedback message of the corresponding client is not received within the pre-defined number of time periods, enter a second deleting submodule; and the second deleting submodule is configured to delete the client identifier from the non-upgradeable list.

Figure 7:
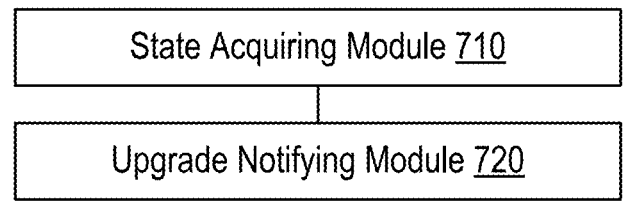
FIG. 7 is a block diagram of an apparatus for upgrading a distributed storage system at a data server side according to some embodiments of the disclosure.

FIG. 7 is a block diagram of an apparatus for upgrading a distributed storage system according to some embodiments of the disclosure. The apparatus may specifically include a state acquiring module 710 and an upgrade notifying module 720.

The state acquiring module 710 is configured to acquire a state for each data server, wherein the state comprises an upgradeable state and a non-upgradeable state, and each data server has one state. The state of the data server is determined according to first feedback information or second feedback information and the first feedback information or the second feedback information is obtained according to a comparison result of the number of successful writes to a pre-defined number after the client sends write requests regarding the same to-be-written data to a plurality of data servers.

In another embodiment of the disclosure, in addition to the state acquiring module 710, the apparatus further includes an upgrade notification sending module configured to send a first upgrade notification to each data server, so that each data server enters an upgrade preparation state. Each data server sends a second upgrade notification to the client after receiving an access request of the client, so that the client enters the upgrade preparation state.

The upgrade notifying module 720 is configured to notify, in a rolling manner, at least one data server in an upgradeable state to perform an upgrade operation, wherein the data server performs the upgrade operation according to the notification.

In another embodiment of the disclosure, the upgrade notification module includes a first selecting submodule configured to select at least one data server in an upgradeable state each time, and notify the at least one data server in the upgradeable state to perform the upgrade operation; and a first monitoring submodule configured to monitor whether the at least one data server in the upgradeable state finishes the upgrade operation fully and, if so, enter the first selecting submodule.

In another embodiment of the disclosure, after the first monitoring submodule, the apparatus further includes a suspending submodule, configured to add the data server into an upgrade blacklist and suspend upgrade of the data server if it is monitored that a result of the upgrade operation of any data server is a failed upgrade.

In another embodiment of the disclosure, the data servers are placed on at least two racks. Then the upgrade notifying module 720 includes an upgrade notifying submodule configured to select a rack having the most data servers that are in an upgradeable state each time, and notify the data servers in the rack to perform an upgrade operation, wherein each data server in the rack checks its own state according to the notification. If a data server is in an upgradeable state, the data server is restarted and upgraded; and if a data server is in a non-upgradeable state or an upgrade-finished state, the data server declines to restart and upgrade.

In another embodiment of the disclosure, in addition to the upgrade notifying submodule, the apparatus further includes a monitoring submodule, configured to monitor whether the data servers in the rack finish the upgrade operation fully and, if so, enter the upgrade notifying submodule.

Figure 8:
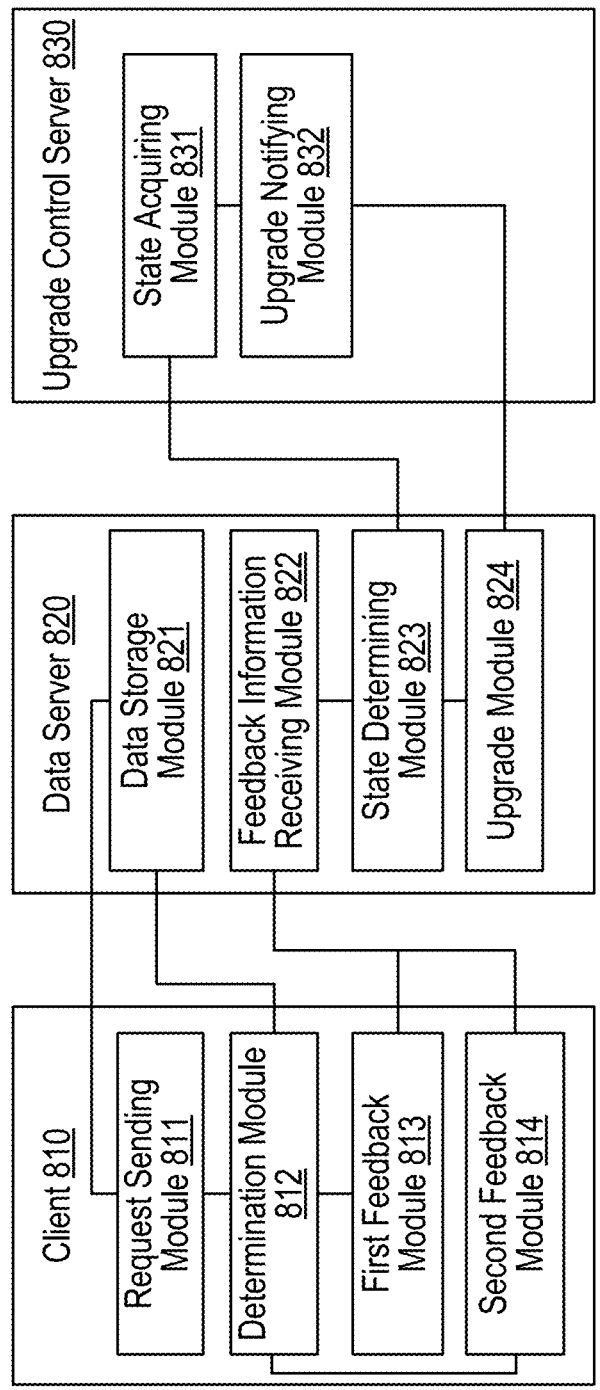
FIG. 8 is a block diagram of an apparatus for upgrading a distributed storage system at an upgrade control server side according to some embodiments of the disclosure.
Figure 8A:
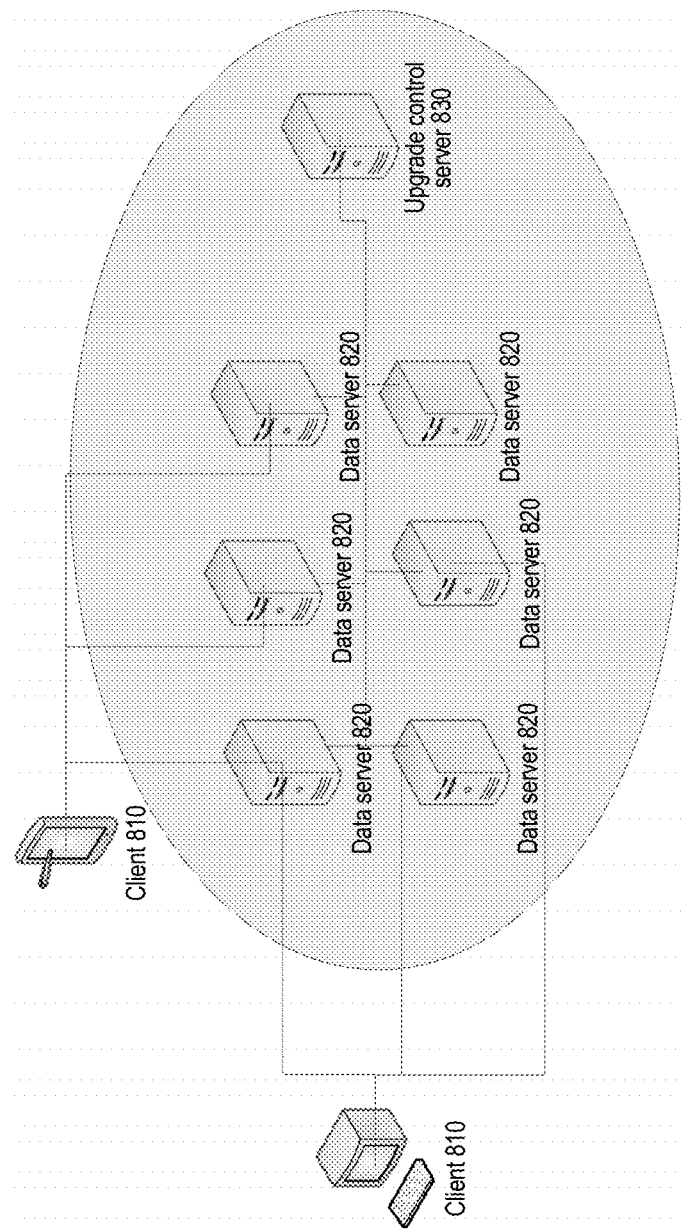
FIG. 8A illustrates an architecture of a distributed storage system according to some embodiments of the disclosure.

Please refer to FIG. 8 and FIG. 8A, which are block diagrams of a system for upgrading a distributed storage system according to some embodiments of the disclosure. The system may specifically include the following modules: clients 810, data servers 820, and an upgrade control server 830.

FIG. 8A is a schematic diagram illustrating an architecture of the distributed storage system in one embodiment. In this embodiment of the disclosure, each client 810 may send write requests to R data servers 820 in the distributed storage system, and the upgrade control server 830 controls the upgrade process of all the data servers.

FIG. 8 illustrates the connection relationships among the client 810, the data server 820, and the upgrade control server 830.

The client 810 includes: a request sending module 811 configured to send write requests regarding the same to-be-written data to a plurality of data servers; a determination module 812 configured to receive responses returned by each of the data servers and determine, based on the responses, if a number of successful writes is greater than a pre-defined number; a first feedback module 813 configured to send first feedback information to each data server having the successful write if the number of the successful writes is greater than the pre-defined number; and a second feedback module 814 configured to send first feedback information to each data server having the successful write if the number of the successful writes is greater than the pre-defined number.

The data server 820 includes a data storage module 821 configured to receive a write request of a client and return a response to the client; a feedback information receiving module 822 configured to receive first feedback information or second feedback information sent by the client; a state determining module 823 configured to do determine the data server's own state according to the first feedback information or the second feedback information when the data serve itself is non-upgraded; and an upgrade module 824 configured to perform an upgrade operation according to a notification of the upgrade control server.

The upgrade control server 830 includes a state acquisition module 831 configured to acquire a state of each data server; and an upgrade notification module 832 configured to notify, in a rolling manner, at least one data server in an upgradeable state to perform an upgrade operation.

In this embodiment of the disclosure, reference may be made to the description in FIG. 5 for the modules of the client. Reference may be made to the description in FIG. 6 for the modules of the data server. Reference may be made to the description in FIG. 7 for the modules of the upgrade control server. The methods performed by these components are similar to the methods described in the aforementioned Figures and will not be described herein again.

In this embodiment of the disclosure, a method for upgrading a distributed storage system in the disclosure is introduced in three aspects including a client, a data server, and an upgrade control server. For clients accessing the distributed storage system, each client sends write requests regarding the same to-be-written data to a plurality of data servers at the same time; then how many data servers have successful writes are analyzed; it is determined whether the number of the successful writes is greater than a pre-defined number; and first feedback information or second feedback information is sent to each data server having a successful write according to the determining result. The data server determines whether it is in an upgradeable or a non-upgradeable state according to the received first feedback information or second feedback information. The upgrade control server may control, in a rolling manner, data servers in the upgradeable state to perform an upgrade operation. Through the aforementioned process, when the upgrade control server controls the data servers in an upgradeable state to upgrade in a rolling manner, high-level services do not need to be stopped because the clients control the states of the data servers and it is ensured that the to-be-written data of any client is written into at least a pre-defined number of data servers for backup. Further, a shorter response time of the distributed storage system to the client can be ensured, improving data reliability and significantly reducing the risk of user data loss. Moreover, the method can tolerate unexpected exceptions in machines during upgrade, ensuring that the service is not affected.

The apparatus embodiments are described relatively concise because they are similar to the method embodiments. Reference may be made to part of the descriptions of the method embodiments for relevant parts.

The embodiments in the specification are described progressively with each embodiment emphasizing a part different from other embodiments. Identical or similar parts of the embodiments may be obtained by referring to one another.

Those skilled in the art should understand that embodiments of the disclosure may be provided as a method, an apparatus, or a computer program product. Therefore, the embodiments of the disclosure may be implemented as a complete hardware embodiment, a complete software embodiment, or an embodiment combining software and hardware. Moreover, an embodiment of the disclosure may employ the form of a computer program product implemented on one or more computer usable storage media (including, but not limited to, a magnetic disk memory, a CD-ROM, an optical memory, and so on) containing computer usable program code therein.

In a typical configuration, the computer device includes one or more processors (CPUs), an input/output interface, a network interface, and a memory. The memory may include a non-transitory computer readable medium in the form of a non-permanent memory, a random access memory (RAM) and/or a non-volatile memory or the like, such as a read-only memory (ROM) or a flash memory (FLASH RAM). A memory is an example of a computer readable medium. The computer readable medium includes permanent and non-permanent, movable and non-movable media that can achieve information storage by means of any methods or techniques. The information may be computer readable instructions, data structures, modules of programs or other data. Examples of a storage medium of a computer include, but are not limited to, a phase-change memory (PRAM), a static random access memory (SRAM), a dynamic random access memory (DRAM) or other types of random access memories (RAMs), a read-only memory (ROM), an electrically erasable programmable read-only memory (EEPROM), a flash memory or other memory technologies, a read-only compact disc read-only memory (CD-ROM), a digital versatile disk (DVD) or other optical storages, a magnetic cassette, a magnetic tape, a magnetic disk storage or other magnetic storage devices, or any other non-transmission medium that can be used for storing information accessible by a computing device. In light of the definitions herein, the computer readable medium does not include non-persistent computer readable media (transitory media), such as modulated data signals and carrier waves.

The embodiments of the disclosure are described with reference to flow diagrams and/or block diagrams according to the method, terminal device (system) and computer program product of the embodiments of the disclosure. It should be understood that each flow and/or block in the flow diagrams and/or block diagrams, and a combination of flows and/or blocks in the flow diagrams and/or block diagrams can be implemented by computer program instructions. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flow diagrams and/or in one or more blocks in the block diagrams.

These computer program instructions may also be stored in a computer readable memory that can direct a computer or another programmable data processing terminal device to operate in a particular manner, such that the instructions stored in the computer readable memory produce an article of manufacture including instruction means, the instruction means implementing the functions specified in one or more flows of the flow diagrams and/or one or more blocks of the block diagrams.

These computer program instructions may also be loaded onto a computer or any other programmable data processing terminal device, such that a series of operation steps are performed on the computer or any other programmable terminal device, thereby generating a computer-implemented process. Therefore, the instructions executed on the computer or any other programmable terminal device provide steps for implementing a specified function in one or more processes in the flow diagrams and/or in one or more blocks in the block diagrams.

Various embodiments of the disclosure have been described; however, once describing basic creative concepts, those skilled in the art can make other variations and modifications of these embodiments. Therefore, the appended claims are intended to be interpreted as including the embodiments and all variations and modifications falling within the scope of the disclosure.

Finally, it should be further noted that the relation terms such as first and second in this application are merely used to distinguish one entity or operation from another entity or operation, and do not require or imply that the entities or operations have this actual relation or order. Moreover, the terms "include," "comprise" or other variations thereof are intended to cover non-exclusive inclusion, so that a process, a method, an article, or a terminal device including a series of elements not only includes the elements, but also includes other elements not clearly listed, or further includes inherent elements of the process, method, article, or terminal device.

The element defined by the statement "including one . . ." without further limitation, does not preclude the presence of additional identical elements in the process, method, article, or terminal device that includes the element.

A method for upgrading a distributed storage system, an apparatus for upgrading a distributed storage, and a system for upgrading a distributed storage provided in the disclosure are introduced above in detail. The principles and implementations of the disclosure are set forth herein with reference to specific examples. Descriptions of the above embodiments are merely served to assist in understanding the method and essential ideas of the disclosure. Those of ordinary skill in the art may make changes to specific implementations and embodiments according to the ideas of the disclosure. In view of the above, the content of the specification should not be construed as limiting the disclosure.

What is claimed is:

1. A method comprising:
    transmitting, by a client device, write requests to a plurality of data servers;
    receiving, by the client device, write responses from the plurality of data servers, each write response indicating whether the respective write request was successful;
    sending, by the client device, if the number of successful write responses is greater than a pre-defined number, first feedback information to a first set of data servers having successful write responses, the first feedback information causing a data server of the first set receiving the first feedback information to update its state to upgradeable; and
    sending, by the client device, if the number of successful write responses is not greater than the pre-defined number, second feedback information to a second set of data servers having successful write responses, the second feedback information causing a data server of the second set receiving the second feedback information to update its state to non-upgradeable.

2. The method of claim 1, wherein prior to transmitting write requests to a plurality of data servers, the method further comprises:
    receiving, at the client device, an upgrade notification from a data server in the plurality of data servers;
    entering, by the client device, an upgrade preparation state upon receiving the upgrade notification.

3. The method of claim 1, the sending second feedback information to a second set of data servers having successful write responses comprising:
    sending, by the client device, the second feedback information to each data server having a successful write response if the number of the successful write responses is equal to the pre-defined number; and
    retrying, by the client device, the write requests if the number of the successful write responses is less than the pre-defined number, the retrying comprising:
        sending, by the client device, additional write requests to at least one data server other than the plurality of data servers,
        receiving, by the client device, write responses returned by the at least one data server;
        sending, by the client device, second feedback information to each data server having the successful write if the number of the successful write responses is equal to the pre-defined number; and
        re-executing, by the client device, the process of retrying the write requests if the number of the successful write responses is equal to the pre-defined number.

4. The method of claim 1, further comprising transmitting, by the client device, second write requests to the first set of data servers or second set of data servers, the second write requests including different data than the write requests.

5. The method of claim 1, the first feedback information and second feedback information each including a client identifier of the client device and the causing a data server to update its state comprising storing the client identifier.

6. A system comprising:
    a plurality of data servers, each data server configured to store a state indicating an upgrade status, the plurality of data servers configured to:
        receive write requests from a client device;
        transmit write responses to the client device, each write response indicating whether the respective write request was successful;
        receive, if the number of successful write responses is greater than a pre-defined number, first feedback information at a first set of data servers having successful write responses, the first feedback information causing a data server of the first set receiving the first feedback information to update its state to upgradeable; and
        receive, if the number of successful write responses is not greater than the pre-defined number, second feedback information at a second set of data servers having successful write responses, the second feedback information causing a data server of the second set receiving the second feedback information to update its state to non-upgradeable.

7. The system of claim 6, the plurality of data servers further configured to:
    receive, in a rolling manner by at least one data server in an upgradeable state, a notification to perform an upgrade operation, the at least one data server performing the upgrade operation according to the notification.

8. The system of claim 7, the plurality of data servers further configured to suspend upgrade of the at least one data server if a result of the upgrade operation of the at least one data server is a failed upgrade.

9. The system of claim 6, the plurality of data servers placed on at least two racks and further configured to:
    receive a notification to perform an upgrade operation;
    restart and upgrade each data server in the data servers in the rack if a respective data server is in an upgradeable state.

10. The system of claim 6, the data servers further configured to transmit upgrade notifications to the client device, the upgrade notifications transmitted in response to a notification to upgrade transmitted by an upgrade control server.

11. The system of claim 10, the plurality of data servers further configured to receive a notification to perform an upgrade operation if the data server's state is upgradeable, the notification sent by an upgrade control server based on a determination of the state of the plurality of data servers.

12. The system of claim 6, the data servers further configured to ignore the first feedback information or second feedback information if a state of the data server is set as upgraded.

13. The system of claim 6, the first feedback information and second feedback information each including a client identifier of the client device and the data servers further configured to:

write the client identifier in the second feedback information into a non-upgradeable list and mark its own state as non-upgradeable upon receiving the second feedback information; and delete the client identifier in the first feedback information from the non-upgradeable list upon receiving the first feedback information and mark its own state as upgradeable after determining that the non-upgradeable list is empty.

14. The system of claim 13, the data servers further configured to:

determine whether the non-upgradeable list contains the client identifier in the first feedback information;

delete the client identifier from the non-upgradeable list if the non-upgradeable list contains the client identifier in the first feedback information; and mark its state as upgradeable if the non-upgradeable list is empty.

15. The system of claim 13, the data servers further configured to:

determine, for a client identifier in the non-upgradeable list, whether a second feedback message of a corresponding client is not received within a pre-defined number of time periods, and delete the client identifier from the non-upgradeable list if the second feedback message of the corresponding client is not received within the pre-defined number of time periods.

16. A method comprising:

receiving, at a data server, first feedback information or second feedback information sent from a client, the first feedback information or the second feedback information obtained according to a comparison between a number of successful writes to a pre-defined number after the client sends write requests regarding the same to-be-written data to a plurality of data servers; and determining, by the data server, a state according to the first feedback information or the second feedback information when the data server is non-upgraded, the state comprising an upgradeable state and a non-upgradeable state, and the state used by an upgrade control server to select and notify, in a rolling manner, the data server to perform an upgrade operation.

17. The method of claim 16, the first feedback information and the second feedback information comprising a client identifier, and the determining the state according to the first feedback information or the second feedback information, comprising:

upon receiving the second feedback information, writing, by the data server, the client identifier in the second feedback information into a non-upgradeable list and marking, by the data server, the state as non-upgradeable; and upon receiving the first feedback information, deleting, by the data server, the client identifier in the first feedback information from the non-upgradeable list and marking, by the data server, the state as upgradeable after determining that the non-upgradeable list is empty.

18. The method of claim 17, the deleting the client identifier in the first feedback information from the non-upgradeable list and marking the state as upgradeable after determining that the non-upgradeable list is empty comprising:

determining, by the data server, whether the non-upgradeable list contains the client identifier in the first feedback information;

deleting, by the data server, the client identifier from the non-upgradeable list if the non-upgradeable list contains the client identifier in the first feedback information;

determining, by the data server, whether the non-upgradeable list is empty; and marking, by the data server, the state as upgradeable if the non-upgradeable list is empty.

19. The method of claim 17, wherein after writing the client identifier in the second feedback information into a non-upgradeable list and marking the state as non-upgradeable, the method further comprises:

for a client identifier in the non-upgradeable list, determining, by the data server, whether a second feedback message of a corresponding client is not received within a pre-defined number of time periods, and if the second feedback message of the corresponding client is not received within the pre-defined number of time periods, deleting the client identifier from the non-upgradeable list.

20. The method of claim 16, wherein prior to receiving first feedback information or second feedback information sent from a client, the method further comprises:

receiving, by the data server, a first upgrade notification sent by the upgrade control server;

entering, by the data server, an upgrade preparation state according to the first upgrade notification; and sending, by the data server, a second upgrade notification to the client after receiving an access request of the client.

* * * * *